(12) United States Patent
Stamm et al.

(10) Patent No.: US 6,711,616 B1
(45) Date of Patent: Mar. 23, 2004

(54) CLIENT-SERVER TASK DISTRIBUTION SYSTEM AND METHOD

(75) Inventors: Reto Stamm, County Tipperary (IE); Mary O'Connor, Dublin (IE)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 09/563,053

(22) Filed: May 1, 2000

(51) Int. Cl.[7] .............................................. G06F 15/173
(52) U.S. Cl. ...................... 709/226; 709/223; 709/229; 709/100; 709/104
(58) Field of Search ................................. 709/200, 201, 709/202, 203, 226, 229, 100, 102, 103, 104, 105, 223, 224, 107

(56) References Cited

U.S. PATENT DOCUMENTS

| | | | | |
|---|---|---|---|---|
| 5,892,945 A | * | 4/1999 | Mirchandaney et al. | 709/104 |
| 5,948,065 A | * | 9/1999 | Eilert et al. | 709/226 |
| 5,991,793 A | * | 11/1999 | Mukaida et al. | 709/104 |
| 6,098,091 A | * | 8/2000 | Kisor | 709/202 |
| 6,112,225 A | * | 8/2000 | Kraft et al. | 709/202 |
| 6,192,388 B1 | * | 2/2001 | Cajolet | 709/100 |
| 6,418,462 B1 | * | 7/2002 | Xu | 709/201 |

* cited by examiner

*Primary Examiner*—Glenton B. Burgess
*Assistant Examiner*—Mareisha Winters
(74) *Attorney, Agent, or Firm*—LeRoy D. Maunu

(57) ABSTRACT

A method and system for distributing by a server data processing system computing tasks for execution amongst a plurality of client data processing systems having different resource characteristics. Each task includes one or more subtasks, and each subtask has one or more resource requirements. Each of the clients requests from the server a subtask upon occurrence of a first event, for example, an idle machine. The server in response to a request from a client, selects a subtask for execution by the client as a function of the resource requirements of the subtask and the particular resource characteristics of the client.

19 Claims, 7 Drawing Sheets

CLIENT-SERVER TASK DISTRIBUTION SYSTEM AND METHOD

FIELD OF THE INVENTION

The present invention generally relates to allocating computing resources for performing a plurality of computing tasks, and more particularly to allocating the computing resources of networked systems for performing the computing tasks.

BACKGROUND

The configuration of information systems in many of today's businesses and other organizations includes a network having dedicated client microcomputers and workstations for various personnel, server computers for printing and for storage of data and software, systems for off-loading computing tasks from the microcomputers, and systems for maintaining business and personnel records. While the proliferation of microcomputers has to some extent increased productivity, there has also been a decrease in computing efficiency.

The level of computing resources, for example, CPU cycles and memory, required by various computing tasks greatly varies depending upon the nature of the task. For example, word processing tasks can generally be run on a microcomputer that is dedicated to a particular person. Simulation tasks such as those for simulating the operation of a circuit, on the other hand, generally require relatively large levels of computing resources. Thus, simulation tasks are often performed on systems other than the microcomputers.

Oftentimes, additional hardware is procured when additional computing tasks are required. For example, when new personnel are added to an organization, additional microcomputers and/or workstations are deployed for the personnel. These workstations are likely to be idle during non-work hours. When simulation is required for new circuits, a new system may be added if the computational resources of a particular, preferred machine are insufficient. A problem with this scenario is that resources may be wasted since the environment as a whole may have sufficient computing resources to perform the additional computing tasks, even though a preferred machine may already be fully utilized. A system and method that address the aforementioned problems, as well as other related problems, are therefore desirable.

SUMMARY OF THE INVENTION

In various embodiments, the invention provides a method and system for distributing by a server data processing system computing tasks for execution amongst a plurality of client data processing systems having different resource characteristics. Each task includes one or more subtasks, and each subtask has one or more resource requirements. Each of the clients requests from the server a subtask upon occurrence of a first event, for example, an idle machine. The server, in response to a request from a client, selects a subtask for execution by the client as a function of the resource requirements of the subtask and the particular resource characteristics of the client.

The above summary of the present invention is not intended to describe each disclosed embodiment of the present invention. The figures and detailed description that follow provide additional example embodiments and aspects of the present invention.

BRIEF DESCRIPTION OF THE DRAWINGS

Various aspects and advantages of the invention will become apparent upon review of the following detailed description and upon reference to the drawings, in which.

Figure 1:
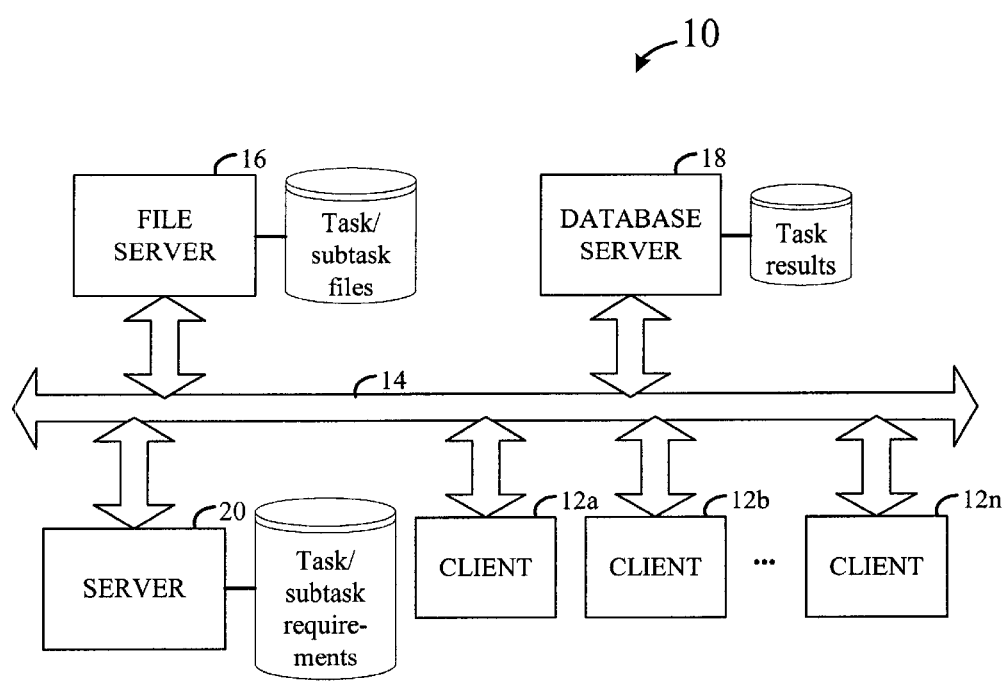
FIG. 1 is a block diagram of a task distribution system in accordance with an example embodiment of the invention.

While the invention is susceptible to various modifications and alternative forms, specific embodiments thereof have been shown by way of example in the drawings and are described in detail herein. It should be understood, however, that the detailed description is not intended to limit the invention to the particular forms disclosed. On the contrary, the intention is to cover all modifications, equivalents, and alternatives falling within the spirit and scope of the invention as defined by the appended claims.

DETAILED DESCRIPTION

A "task" in this patent application is comprised of one or more subtasks. Depending upon the particular functions of the tasks and subtasks, some work may depend on other work having been previously performed, while yet other work may be independent of other work. Thus, some tasks and subtasks may need to be performed sequentially, while other tasks can be performed in parallel. Whether particular tasks or subtasks can be performed in parallel or must be performed sequentially depends on the nature of the work to be performed and is beyond the scope of this invention. However, it will be appreciated that the various embodiments of the invention use the sequential versus parallel characteristics of the tasks and subtasks in selecting subtasks for processing by clients.

FIG. 1 is a block diagram of a task distribution system 10 in accordance with an example embodiment of the invention. System 10 includes a plurality of client data processing systems ("clients") 12a–n coupled to a local area network 14, for example. Server data processing systems ("servers") 16, 18, and 20 are also coupled to network 14. Clients 12a–n are workstation class systems, for example, that are configured for various uses. Example uses include engineering, accounting, animation, and scientific computation as well as other applications. According to one embodiment, clients 12a–n are configured with respective software that monitors local resource usage and resource availability on the clients. When a client has sufficient resource availability, the client requests work from server 20. For example, when users of the client workstations are away, the clients detect the inactivity and initiate requests to the server.

Server 20 is also a workstation class system, for example, that is configured with software that is responsive to work requests from clients 12a–n. Computing work to be performed is organized by server 20 into tasks and subtasks, for example. Each task is independent of other tasks and is comprised of one or more subtasks. The subtasks within a task may have a required order of execution or may be performed in parallel, depending upon the software structure of a particular task. Those skilled in the art will recognize that in another embodiment there could be various dependencies between tasks, or a multi-level hierarchy of tasks and subtasks could be utilized.

When server 20 receives a work request from a client, server 20 finds the subtask with resource requirements best matching the available resources of the requesting client. In another embodiment, the tasks are further categorized, and each category is allotted a selected portion of the total of the available resources. The selection of a subtask by server 20 is partially based on the portions of the total available computational resources already allocated to the various categories of tasks, as further illustrated and explained in FIG. 5.

Once server 20 has selected a particular subtask, server 20 returns a reference to the subtask, for example, a command by which the subtask is performed, to the requesting client. The requesting client then invokes the command to execute the subtask on the client.

In the example embodiment, file server 16 is configured with the software that comprises the subtasks. It will be appreciated that the functions of server 20 and subtasks of server 16 could be consolidated into a single server in an alternative embodiment. Alternatively, the subtasks may be resident on a plurality of file servers. File server 16 responds to a request for a subtask from a client by transferring the software that comprises the subtask to the requesting client. The client thereafter executes the subtask.

Database server 18, in another example embodiment, is coupled to network 14 and configured with software that interfaces with the subtasks. For some tasks, such as testing logic cores for FPGAs, the various subtasks record test results in a task results database, which permits subsequent analysis of the test results. It will be appreciated that other types of tasks may not require a results database.

The server configurations are examples only. It will be appreciated that the server functions could be consolidated in a single server or in various combinations of servers in other embodiments.

Figure 2:
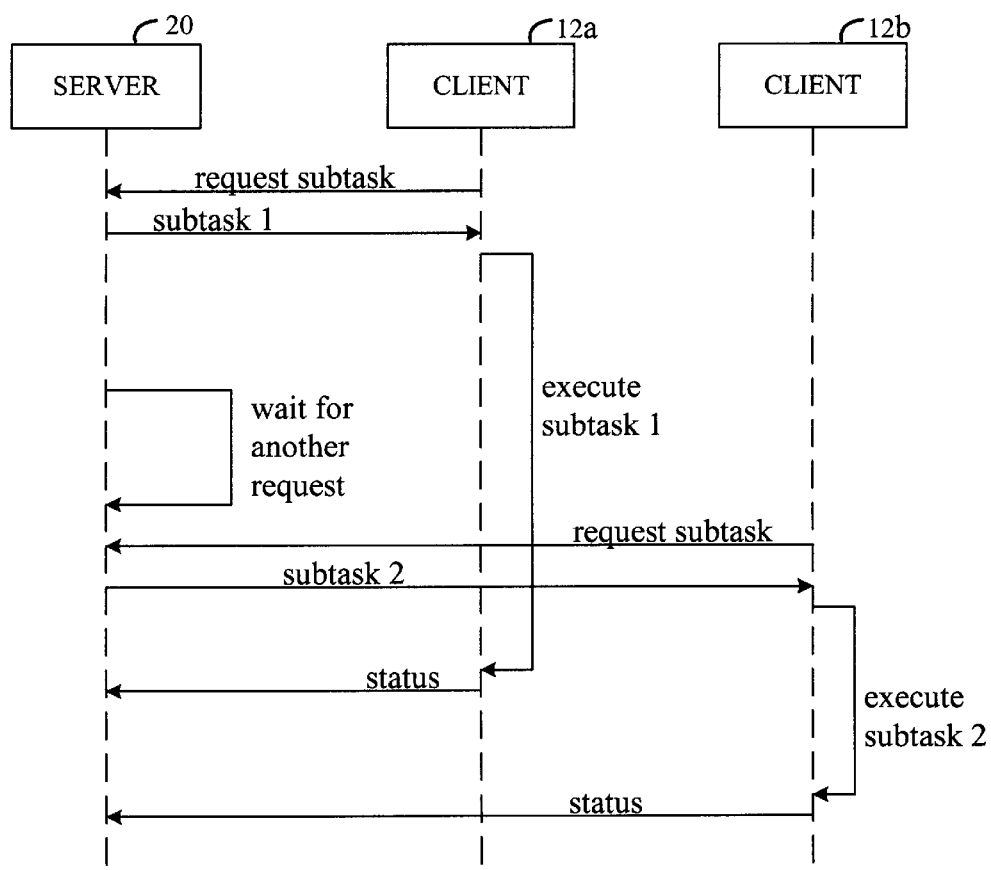
FIG. 2 is a flow diagram that illustrates an example scenario of the flow of requests and subtasks between two example clients and a task server.

FIG. 2 is a flow diagram that illustrates an example scenario of the flow of requests and subtasks between two example clients 12a and 12b and server 20. The vertical dashed lines represent the processing performed by server 20 and clients 12a and 12b; the horizontal directional lines represent the flow of requests and subtasks between clients 12a and 12b and server 20. A directional line that begins on a dashed line and ends on the same dashed line represents processing performed within the associated server 20 or client 12a and 12b. The flow of time moves down the vertical dashed lines.

The scenario begins with a request for a subtask being sent from client 12a to server 20. In an example embodiment, a client initiates a request for a subtask when the client detects that it has some predetermined level of resources available. For example, client 12a being an engineering workstation may be used during the course of a workday for design development purposes by a particular engineer. During non-work hours, the machine may sit idle. Thus, client 12a is configured with software that monitors system usage, for example, and makes requests for work when the engineer is no longer using the machine. Alternatively, client 12a may be configured to begin making requests for subtasks at a certain time of day and cease requesting work at some later time.

In one embodiment the request for a subtask includes data that indicate the identity of the requesting client 12a and the resource availability of client 12a. For example, the request may indicate the processor type, processor speed, memory configuration, cache configuration, swap size, licensed software, and other data pertinent to the selection of a suitable subtask for execution on a client. Server 20 then examines the resource requirements for the subtasks to be performed and selects a subtask having resource requirements that most closely match the available resources of the requesting client. As discussed above, the task categories may also be considered in selecting a suitable subtask. Server 20 selects subtask 1 and returns the selection to client 12a in the form of a command, for example.

Client 12a then executes subtask 1 using its local resources. Meanwhile, server 20 waits for another request for a subtask from a client. When client 12b requests a subtask, server 20 selects subtask 2 for execution and returns the command for subtask 2 to client 12b. While client 12b is executing subtask 2, client 12a finishes execution of subtask 1 and returns a status to server 20. Server 20 uses the status information in processing subsequent subtask requests. For example, if the subtasks within a task must be performed sequentially, and a failure of one of the tasks precludes execution of subtasks that follow, then server 20 must be informed when a subtask fails so that the following subtasks are not selected for execution. The scenario is complete when client 12b reports the status of its execution of subtask 2 to server 20.

Figure 3:
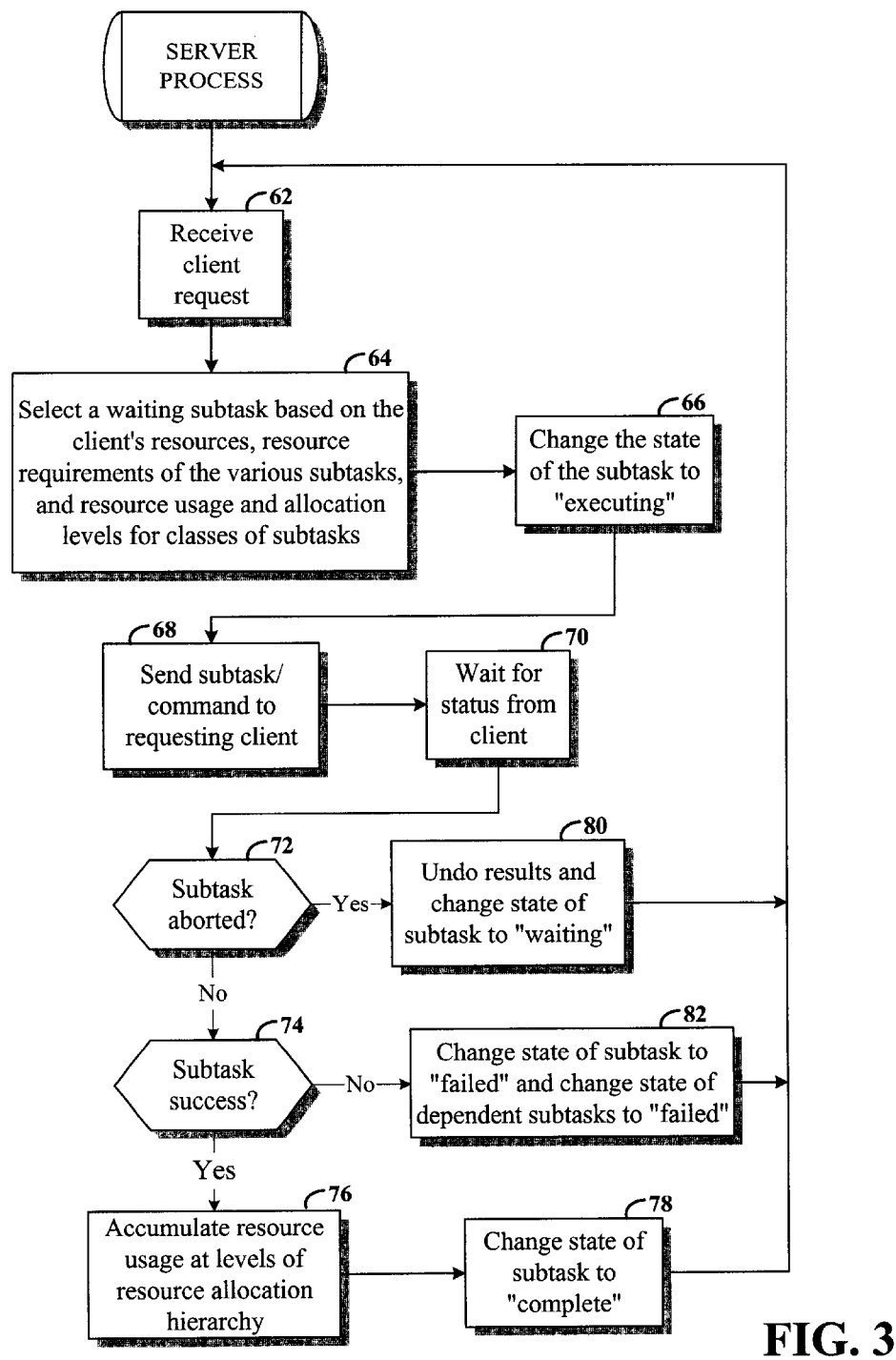
FIG. 3 is a flowchart of an example process performed by software executing on a server for selecting subtasks to be executed by a plurality of clients.

FIG. 3 is a flowchart of an example process performed by software executing on server 20 for selecting subtasks to be executed by clients 12a–n. In an example embodiment, the process is multithreaded to permit concurrent processing of subtask requests by server 20. At step 62, a request for a subtask is received from a client. The client may indicate in the request the resources that the client has available. Alternatively, the server may maintain a database of resource information for the respective clients.

Figure 6:
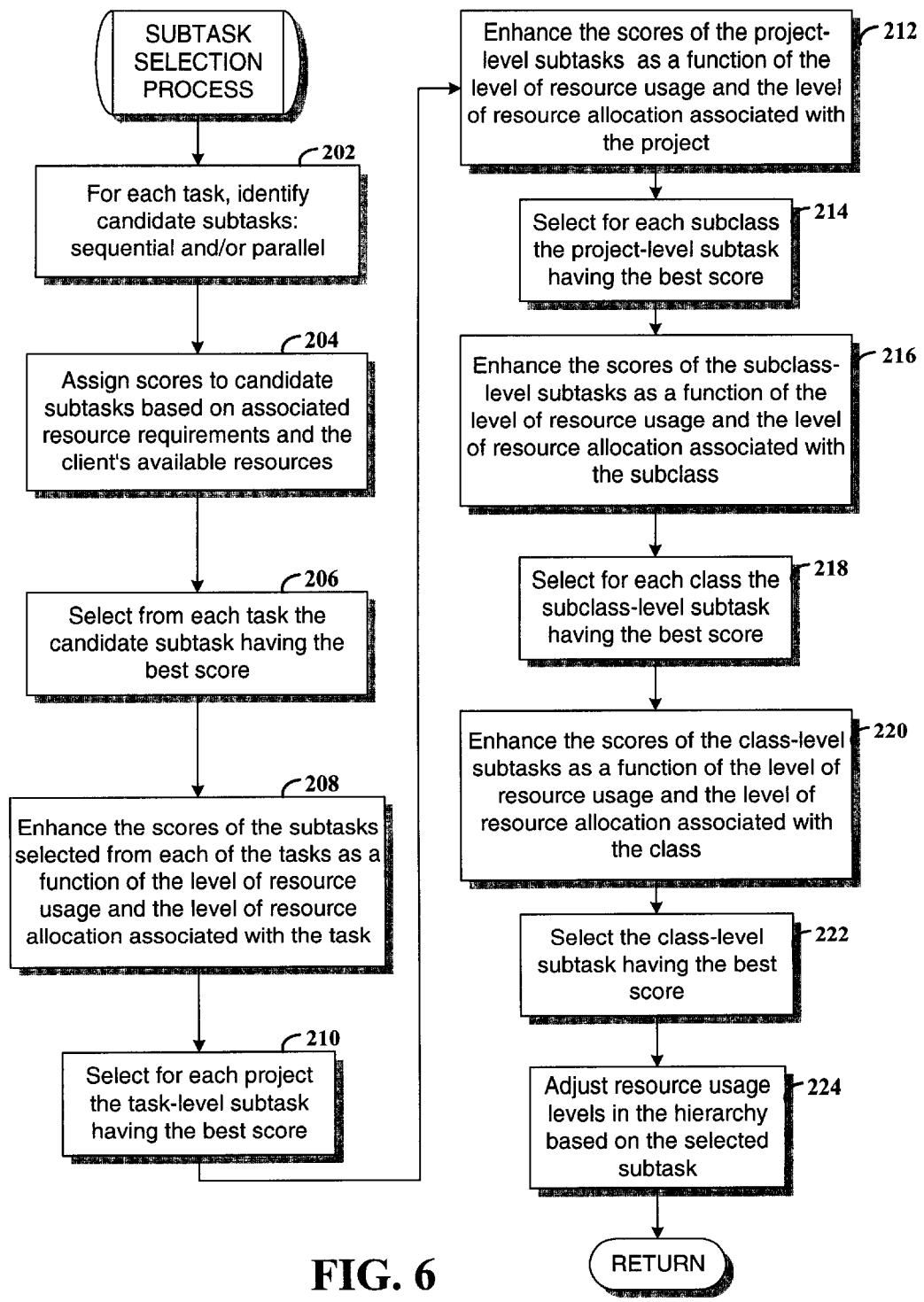
FIG. 6 is a flowchart that shows the process performed by a server in selecting a subtask for execution by a requesting client, in accordance with an example embodiment of the invention.

At step 64, server 20 selects from the waiting subtasks a subtask for execution by the requesting client. The selection is based on the client's resources, resource requirements of the subtasks, and resource usage and allocation levels for the classes of subtasks. FIG. 6 further illustrates an example process for selecting a subtask. At step 66, the state of the selected subtask is changed to "executing" so that the subtask is not sent to another client for execution.

A command that references the selected subtask is sent to the requesting client at step 68, and at step 70, server 20 waits for status data from the client before continuing. Because the process is multithreaded, server 20 continues to process subtask requests received from other clients.

Figure 5:
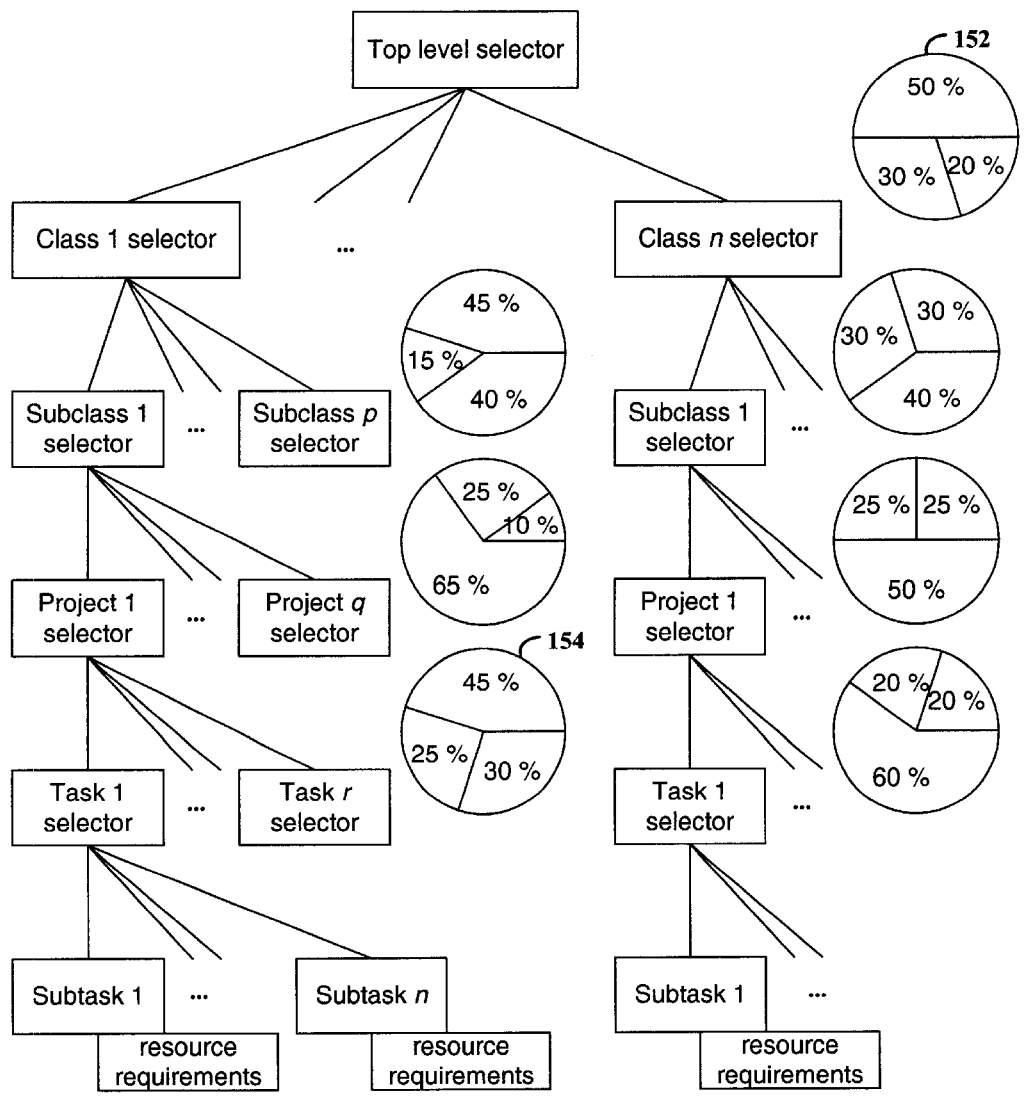
FIG. 5 is an example hierarchy of various class selectors of tasks and the allocations of computation resources between the classes of tasks.
Figure 7:
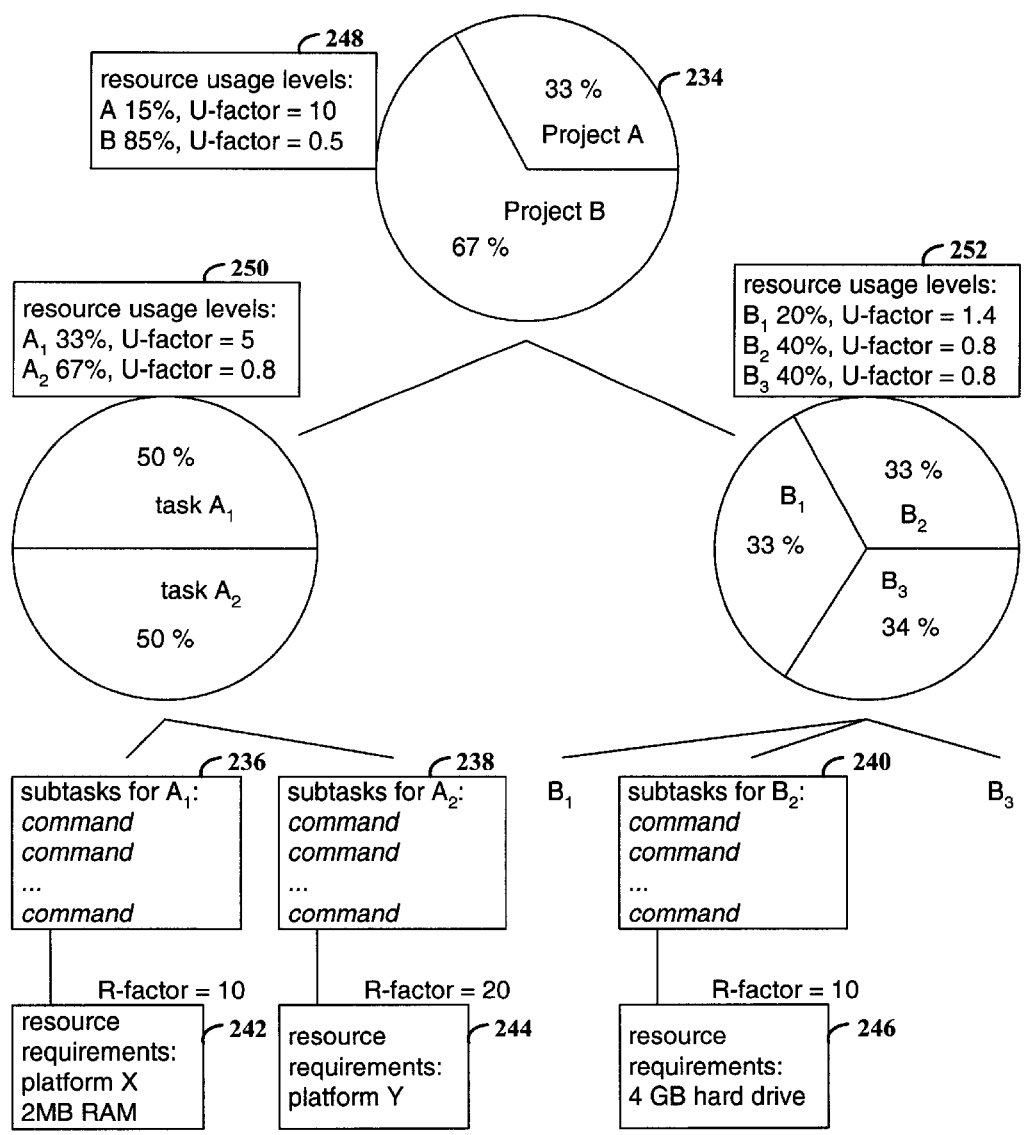
FIG. 7 depicts an example subtask selection scenario.

Decision step 72 directs control to decision step 74 if the status returned from the client indicates that the subtask completed execution. If the status data further indicate that the subtask completed successfully, decision step 74 directs control to step 76 where the resource usage levels are accumulated at the various levels of the hierarchy of classes of tasks. The resource usage levels can be accumulated by accumulating the number of subtasks completed in the different levels in the hierarchy. In another embodiment, normalized CPU usage can be accumulated for completed subtasks in the different levels of the hierarchy. FIGS. 5, 6, and 7 provide further details relative to a task hierarchy and associated resource requirements, allocation, and usage levels.

At step 78, the state of the executed subtask is changed to "complete" so that the subtask is not selected for execution by another client.

If the client executing the subtask aborted the subtask, decision step 72 directs control to step 80. An example situation in which the client would abort the subtask is where the client workstation user returns to use the workstation for other purposes. This situation may be detected, for example, with a keyboard monitor that detects keyboard activity upon the user's return. At step 80, any results reported by the aborted subtask are undone, and the state of the subtask is changed to "waiting" so that the subtask can be once again considered for execution.

At step 74, if the subtask did not complete successfully, control is directed to step 82 where the state of the subtask is changed to "failed," as are the states of any other subtasks that depend on the executed subtask. The dependent subtasks are marked as failed so that the server does not subsequently consider them for execution.

Figure 4:
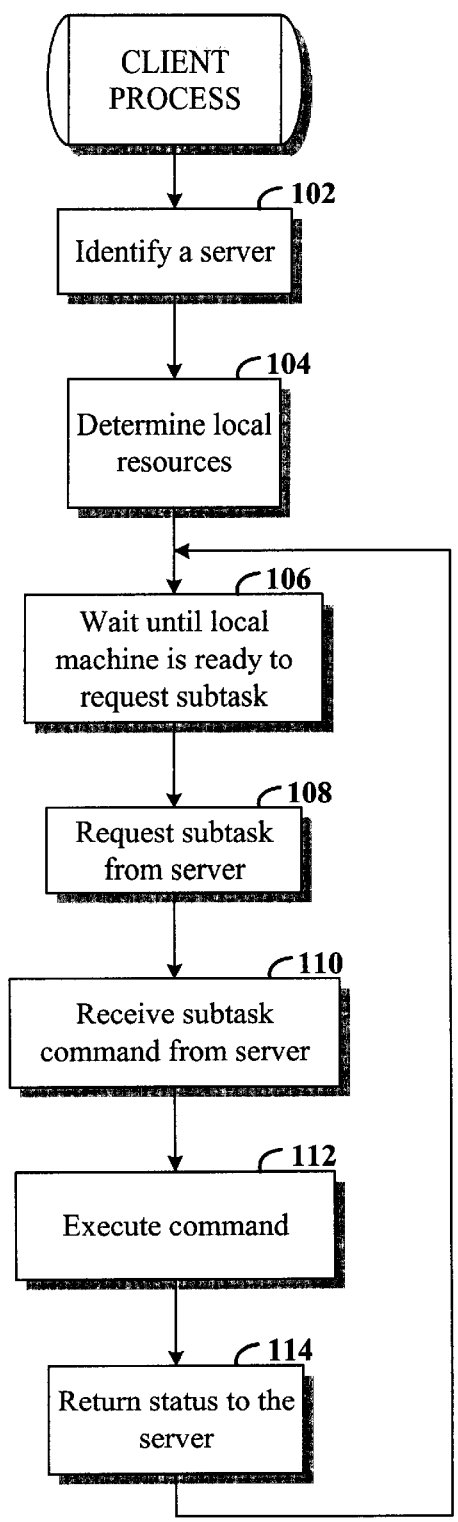
FIG. 4 is a process performed by an example client in requesting work from a server.

FIG. 4 is a process performed by an example client in requesting a subtask from a server. Step 102 is a preliminary step in which the server to which the client makes requests is identified. For example, the server may be specified in a configuration file. At step 104, the client determines its own available computing resources. In the example embodiment, these resources are reported to the server in requesting a subtask.

The client waits until the resources are available at step 106, and at step 108, requests a subtask from the server. Various monitors may be used to determine when the client is available to request a subtask from the server. The particular resources of the client that are monitored depend on the nature of the activity for which the client is used. For example, for some clients it is suitable to monitor keyboard usage: if the keyboard is inactive for a predetermined period of time, then the client may be available to perform work for the server. Monitoring of CPU usage is suitable for some clients, while time-of-day monitoring is suitable for other clients. In yet another embodiment, the quantity of memory available is monitored.

At step 110, the client receives a subtask command from the server, and executes the command at step 112. The command references a subtask stored on a network file server, for example. Executing the command causes the software comprising the subtask to be downloaded to and executed by the client. Upon completion, the status of the subtask is returned to the server at step 114. Control is then returned to step 106 to again wait until the client is available to request another subtask.

While not shown, it will be appreciated that the client also includes a monitor that checks for the resumption of primary activities at the client. The primary activities are those for which the client workstation was deployed, for example, engineering design. Keyboard usage, CPU activity, and memory usage are monitored in other example embodiments. In another embodiment, the time of day is monitored.

FIG. 5 is an example hierarchy of selectors and the allocations of computation resources between classes of tasks. The allocations are used, in part, by server 20 in selecting a particular subtask for a requesting client. As set forth above, the available resources of the requesting client and the resource requirements of the subtasks are also used in selecting a subtask.

The purpose of the hierarchy is to classify the various tasks to be performed, define an allocation of resources amongst the classes of tasks, and select from each class one of a plurality of subtasks based on the criteria previously described. The selectors in the hierarchy can be implemented, for example, using object-oriented programming techniques.

For purposes of illustration, the hierarchy corresponds to an example business and the selection of tasks to be performed. The business is comprised of n business units (classes), and each business unit is comprised of one or more departments (subclasses). A subclass is in turn comprised of one or more projects, and each project has one or more tasks to be performed. Each task is comprised of one or more subtasks, as previously described, and each subtask has associated resource requirements. The resource requirements can be defined for a subtask, for example, based on prior executions of the subtask.

The top level selector selects a subtask from amongst the subtasks to be performed by the various business units that comprise the business. Each class selector selects a subtask from the subtasks provided by each of the constituent subclass selectors. For example, the class 1 selector selects a subtask from subclass selectors 1-p. Each subclass selector selects a subtask from the subtasks provided by the respective constituent project selectors. For example, subclass 1 selector of class 1 selects between the subtasks provided by project selectors 1-q. Each project selector selects a subtask from those provided by the respective constituent task selectors. For example, the project 1 selector of class 1 selects a subtask from those provided by the task selectors 1-r. Each task selector selects one of the subtasks that comprise the corresponding task. As explained above, some tasks may be comprised of subtasks that must be executed sequentially, and other tasks may be comprised of tasks that may be run in parallel. Still other tasks may include various combinations of sequential and parallel subtasks.

At the class, subclass, project, and task levels of the hierarchy, respective resource allocations are defined. The resource allocation at a level in the hierarchy is used in selecting a subtask. Each of the allocations is represented as a pie chart. For example, at the class level of the hierarchy, allocation 152 has 30% of the resources allocated to class 1 tasks, 20% of the resources allocated to class n tasks, and 50% of the resources allocated to the remaining classes 2-(n−1).

The top level selector uses the resource allocation at the class level in selecting a subtask. For example, if tasks from class 1 are presently consuming 30% of the resources and tasks from class n are presently consuming 10% of the resources, then top level selector uses that information in selecting between subtasks provided from the class 1 and class n selectors. That is, the subtask of class n is more likely to be selected than the subtask of class 1. It will be appreciated that the tasks of classes 2-(n−1) also have present allocation levels that are considered in making a selection.

Each selector in the hierarchy uses an allocation of resources between the constituent classes, subclasses, projects, or tasks in selecting a subtask to perform. For example, the project 1 selector of class 1 uses an allocation associated with tasks 1-r in selecting a subtask provided from the task selectors. Allocation 154 has, for example, 45% of the resources allocated to task 1, 25% of the resources allocated to task r, and 30% of the resources allocated to the remaining tasks 2-(r−1). The selection of a subtask using the allocations is further described in the flowchart of FIG. 6.

FIG. 6 is a flowchart that shows the process performed by server 20 in selecting a subtask for execution by a requesting client, in accordance with an example embodiment of the invention. FIG. 6 provides one embodiment of step 64 in FIG. 3. Generally, the subtask selection process assigns scores to the subtasks based on the resource requirements of the subtasks and the resources available from the client, and the highest scoring subtask from each of the tasks is selected. The next level selector in the hierarchy (project) then enhances the respective subtask scores based on the associated allocation of resources and the present level of resource usage by the respective tasks. Each selector selects the subtask having the highest score and provides the selected subtask to the next level in the hierarchy.

At step 202, each task selector identifies a respective set of candidate subtasks. The set of candidate subtasks for a task may be a single subtask if the subtasks must be performed sequentially, or may include a plurality of subtasks if the subtasks can be performed in parallel. At step 204, scores are assigned to the subtasks based on the associated resource requirements and the requesting client's available resources. In one embodiment, different sets of resource requirements may have different relative resource factors ("R-factors") that are used for scoring. For example, the R-factor of 20 is associated with one set of resource requirements including the requirement of a particular computing platform (e.g., Windows NT™), while the R-factor of 10 is associated with another set of requirements including a different computing platform (e.g., Sun Solaris™) and 200 MB of RAM. If a client of the first computing platform requests a subtask, a subtask having the first set of resource requirements is given an initial score of 20 based on the associated R-factor since the client's resources match the subtask's resource requirements, and a subtask having the second set of resource requirements is given an initial score of 0 since the client's resources do not match.

Each task selector selects the highest scoring subtask at step 206. At step 208, the project level selectors enhance the scores of the subtasks provided by the task selectors. For a particular project selector, the scores are enhanced based on resource allocation for the tasks that are associated with the project selector and the present level of resource usage by the tasks. Generally, a subtask's score is decreased if it is of a class in which the resource usage level is greater than the resource allocation level of the class, and a subtask's score is increased if it is of a class in which the resource usage level is less than the resource allocation level of the class. Further details pertaining to enhancing scores are provided in the scenario depicted in FIG. 7.

At step 210, the project selectors select respective subtasks having the greatest scores. At step 212, the subclass selectors in the next level of the hierarchy enhance the scores of the subtasks provided by the respective project selectors. The scores are enhanced as a function of the level of resource usage by the projects and the resource allocations associated with the projects. At step 214, each subclass selector selects a highest scoring subtask and provides the selected subtask to the associated class selector.

The class selectors enhance the scores of the subtasks provided by the subclass selectors at step 216. The scores are enhanced as a function of the level of resource usage by the subclasses of tasks and the resource allocations associated with the subclasses. The respective highest scoring subtasks are selected by the class selectors at step 218.

At step 220, the top level selector enhances the scores of the subtasks provided by the class selectors. The scores are enhanced as a function of the level of resource usage by the classes of tasks and the resource allocations associated with the classes. The top level selector selects at step 222 the highest scoring subtask as the subtask to be performed by the client. At step 224, the resource usage levels in the associated levels of the task hierarchy are adjusted based on the selected subtask. In one embodiment, the resource usage levels are accumulated based on the number of subtasks processed, and in another embodiment, the resource usage levels are accumulated based on CPU usage. Control is then returned to step 66 of FIG. 3.

It will be appreciated that the scoring method described herein is an example only. Other methods that select a subtask based on the resource requirements of the subtasks and resource allocations for various classes of tasks are also suitable. For example, another method entails searching a list of subtasks having associated resource requirements and selecting the first subtask having requirements that match the resources available on the client.

FIG. 7 depicts an example subtask selection scenario. The scenario of FIG. 7 includes a hierarchy having a project level, a task level, and a subtask level. The resource allocation for projects A and B is shown with circle 234, with 33% of the resources allocated to project A and 67% of the resources allocated to project B. Recall that the allocation percentages are desired allocation levels and not the level of resources actually in use.

Project A includes tasks $A_1$ and $A_2$ having respective resource allocation levels of 50%, and project B includes tasks $B_1$, $B_2$, and $B_3$, having allocation levels of 33%, 33%, and 34%, respectively. Block 236 shows the subtasks associated with task $A_1$, block 238 shows the subtasks associated with task $A_2$, and Block 240 shows the subtasks associated with task $B_2$. The subtasks associated with tasks $B_1$ and $B_3$ are not shown, in the interest of brevity. Blocks 242, 244, and 246 show the resource requirements that are respectively associated with the subtasks of $A_1$, $A_2$, and $B_2$. The subtasks of $A_1$ require platform X and 2 MB of RAM, the subtasks of $A_2$ require platform Y, and the subtasks of $B_2$ require a 4 GB hard drive. The subtasks of $A_1$ have an associated R-factor of 10, the subtasks of $A_2$ have an associated R-factor of 20, and the subtasks of $B_2$ have an associated R-factor of 10. As described above, the R-factors are used in assigning initial scores to subtasks having resource requirements that match the resources available from a requesting client.

Blocks 248, 250, and 252 show example resource usage levels of project A relative to project B, task $A_1$ relative to task A2, and tasks $B_1$, $B_2$, and $B_3$, relative one to another. Blocks 248, 250, and 252 also include usage-level factors ("U-factors") that are respectively associated with the projects and tasks. The usage-levels and U-factors show actual usage, as opposed to the desired allocation levels shown in the pie charts. The U-factors are used to adjust the scores of subtasks in the different levels of the hierarchy. When a subtask is selected to be issued to a client, the usage levels and U-factors of the appropriate portions of hierarchy 232 are adjusted to reflect the new state of resource usage.

If, for example, a client of platform type Y requests a subtask, assuming the state of the hierarchy of FIG. 7, the server scores subtasks and selects a subtask as follows. Since the subtasks of $A_1$ require platform X, the score of a selected one of the subtasks of $A_1$ is 0 since the resource requirements do not match the resources available form the client.

The subtasks of $A_2$ require platform Y and have an associated R-factor of 20. Thus, a selected one of the $A_2$ subtasks is assigned an initial score of 20. For task $B_2$, a selected one of the subtasks is assigned an initial score of 10, assuming that the requesting client has a 4 GB hard drive.

The scores of the selected subtasks from $A_2$ and $B_2$ are then adjusted (either enhanced or degraded) based on the associated U-factors. The score of 20 from subtask of $A_2$ is multiplied by the U-factor of 0.8, which results in an adjusted score of 16. The score of the subtask of $A_2$ is reduced because the present usage level of $A_2$ (67%) is greater than the target allocation level (50%). Similarly, the score of the $B_2$ subtask is adjusted by multiplying the initial score of 10 by the U-factor of 0.8, yielding an adjusted score of 8.

Moving to the next level in the hierarchy, project A subtasks have a usage level of 15% and an associated U-factor of 10, and project B subtasks have a usage level of 85% and a U-factor of 0.5. The adjusted scores of the subtasks from the lower levels of the hierarchy are adjusted again: the adjusted score of 16 of the subtask from task $A_2$ is multiplied by 10 (final score=160), and the adjusted score of 8 of the subtask of $B_2$ is multiplied by 0.5 (final score=4). Since the score of the subtask from project A is greater, it is selected for processing by the requesting client.

After a subtask has been selected, the usage levels and U-factors in the appropriate portions of the hierarchy are adjusted. Since a subtask from $A_2$ was selected, the usage levels and U-factors between projects A and B and tasks $A_1$ and $A_2$ are adjusted. In one embodiment, the usage levels are adjusted by accumulating the number of subtasks completed in the different classes. For example, if 3 subtasks of project A are complete and 9 tasks of project B are complete, the usage levels are set to 25% (3/(3+9)) and 75% (9/(3+9)), respectively. Similar adjustments are made to the usage levels for tasks $A_1$ and $A_2$.

In another embodiment, CPU usage of in-process and completed subtasks is accumulated at the levels of the hierarchy. It will be appreciated that the CPU usage levels may be normalized to accommodate different processors. For CPU usage levels, start times are recorded for each in-process subtask. When a client requests a subtask, the differences between the start times and the present times are calculated to determine respective CPU usage levels of the subtasks. The respective CPU usage levels of the subtasks are then accumulated to determine the relative resource usage levels in the different levels of the hierarchy. Note that when a subtask complete, the associated CPU usage is saved for subsequent accumulations. The U-factors in a class are adjusted based on the relative usage and allocation levels within the class. For example, if the usage level is greater than the allocation level for a task, the U-factor is set to less than 1 to reduce the score when the score is multiplied by the U-factor. A U-factor greater than 1 increases a score.

Accordingly, the present invention provides, among other aspects, a system and method for allocating subtasks to a plurality of client servers based on resource requirements of the subtasks and resource characteristics of the client servers. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A computer-implemented method for distributing by a server data processing system a plurality of tasks for execution amongst a plurality of client data processing systems having different sets of resource characteristics, each task including one or more subtasks, and each subtask having one or more resource requirements, comprising:

establishing respective allocation-portions of a total of a resource provided by the clients for a plurality of classes of tasks;

tracking present levels of usage of the resource by the classes of tasks;

prioritizing subtasks as a function of the present levels of usage of the resource by the classes of tasks and the respective allocation portions of the total of the resource, thereby establishing relative priorities of the subtasks;

in each of the clients, requesting from the server a subtask upon occurrence of a first event; and in the server in response to a request from a client, selecting a selected subtask for execution by the client as a function of the resource requirements of the subtask, the resource characteristics of the client, and the relative priorities of the subtasks.

2. The method of claim 1, further comprising, in each of the clients, reporting to the server an associated status of the selected subtask upon completion of the selected subtask.

3. The method of claim 2, further comprising in each of the clients upon completion of a prior subtask, repeating, until occurrence of a second event, the steps of requesting a subtask from the server and reporting the associated status.

4. The method of claim 1, further comprising, in a request from a client to a server for a subtask, indicating to the server the resource characteristics of the client.

5. The method of claim 1, further comprising, predefining the respective client resource characteristics as data accessible to the server.

6. The method of claim 1, further comprising in each client, monitoring levels of usage of one or more resources of the client; and requesting a subtask from the server when the monitored level of usage falls below a predetermined level.

7. The method of claim 6, wherein in at least one client, one of the resources is a CPU, and further comprising requesting from the server a subtask when a level of usage of the CPU is below a predetermined level.

8. The method of claim 7, further comprising requesting from the server a subtask when the level of usage of the CPU is below the predetermined level for a predetermined period of time.

9. The method of claim 6, wherein in at least one client, one of the resources is a keyboard, and further comprising requesting from the server a subtask when a level of usage of the keyboard is below a predetermined level.

10. The method of claim 9, further comprising requesting from the server a subtask when the level of usage of the keyboard is below the predetermined level for a predetermined period of time.

11. The method of claim 6, wherein in at least one client, one of the resources is memory, and further comprising requesting from the server a subtask when a level of usage of the memory is below a predetermined level.

12. The method of claim 11, further comprising requesting from the server a subtask when the level of usage of the memory is below the predetermined level for a predetermined period of time.

13. The method of claim 6, wherein in at least one client, the resources include a CPU, keyboard, and memory, and further comprising requesting from the server a subtask when levels of usage for the CPU, keyboard, and memory are below predetermined levels.

14. The method of claim 13, further comprising requesting from the server a subtask when the levels of usage for the CPU, keyboard, and memory are below the predetermined levels for a predetermined period of time.

15. The method of claim 6, further comprising:

in each client, monitoring levels of usage of one or more resources of the client while executing a subtask on the client; and aborting the subtask on the client when a level of resource usage on the client exceeds a predetermined level.

16. The method of claim 15, wherein in at least one client, the resources include the group of a keyboard and a mouse, and further comprising aborting the subtask on the client when activity is detected on one of the resources.

17. The method of claim 1, further comprising:

assigning initial respective scores to the subtasks as a function of the resource requirements of the subtasks and the resource characteristics of the client, wherein relatively better scores are assigned to subtasks having resource requirements that more closely match the resource characteristics of the client;

adjusting the scores as a function of the present levels of usage of the resource by the classes of tasks and the respective allocation portions of the total of the resource; and selecting a subtask having a best score.

18. A client-server data processing system for distributing a plurality of tasks for execution amongst a plurality of client data processing systems having different sets of resource characteristics, each task including one or more subtasks, and each subtask having one or more resource requirements, comprising:

a plurality of client systems, each client system configured and arranged to request from the server a subtask upon occurrence of a first event; and a server system coupled to the client systems, the server system configured and arranged to establishing respective allocation portions of a total of a resource provided by the clients for a plurality of classes of tasks, track present levels of usage of the resource by the classes of tasks, prioritize subtasks as a function of the present levels of usage of the resource by the classes of tasks and the respective allocation portions of the total of the resource, thereby establishing relative priorities of the subtasks, and select, in response to a request from a client, a subtask for execution by the client as a function of the resource requirements of the subtask, the resource characteristics of the client, and the relative priorities of the subtasks.

19. An apparatus for distributing by a server data processing system a plurality of tasks for execution amongst a plurality of client data processing systems having different sets of resource characteristics, each task including one or more subtasks, and each subtask having one or more resource requirements, comprising:

means for establishing respective allocation portions of a total of a resource provided by the clients for a plurality of classes of tasks;

means for tracking present levels of usage of the resource by the classes of tasks;

means for prioritizing subtasks as a function of the present levels of usage of the resource by the classes of tasks and the respective allocation portions of the total of the resource, thereby establishing relative priorities of the subtasks;

in each of the clients, means for requesting from the server a subtask upon occurrence of a first event; and in the server in response to a request from a client, means for selecting a selected subtask for execution by the client as a function of the resource requirements of the subtask, the resource characteristics of the client, and the relative priorities of the subtasks.

* * * * *